United States Patent Office 3,438,990
Patented Apr. 15, 1969

3,438,990
NOVEL 1-CYCLOALKENYL-PIPERIDINES
Herbert Merz, Hans-Detlef Schroeder, Adolf Langbein, and Karl Zeile, Ingelheim am Rhein, Germany, assignors to Boehringer Ingelheim G.m.b.H., Ingelheim am Rhein, Germany, a corporation of Germany
No Drawing. Filed June 29, 1966, Ser. No. 561,389
Claims priority, application Germany, June 29, 1965, B 82,611
Int. Cl. C07d 29/24, 29/20; A61k 27/00
U.S. Cl. 260—294.3          10 Claims

ABSTRACT OF THE DISCLOSURE

A member selected from the group consisting of compounds of the formula

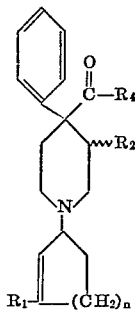

wherein
$R_1$ is hydrogen, chlorine or bromine
$R_2$ is hydrogen, α-methyl or β-methyl
$R_3$ is m-hydroxyl, p-hydroxyl, m-methoxy or p-methoxy
$R_4$ is methyl, ethyl, propyl, methoxy, ethoxy or propoxy, and
$n$ is an integer from 1–4 inclusive and pharmacologically acceptable acid addition salts thereof. These compounds prepared by reacting an appropriately substituted piperidine with a 1-halo 3-$R_1$ cycloalkene exhibit analgesic and morphine antagonistic properties.

---

This invention relates to novel 1-cycloalkenylpiperidines and acid addition salts thereof, as well as to a process of preparing such compounds.

More particularly, the present invention relates to novel 1 - cycloalkenyl-4-phenyl-4-acyl-piperidines and 1-cycloalkenyl - 4-phenyl-4-alkoxycarbonyl-piperidines of the formula

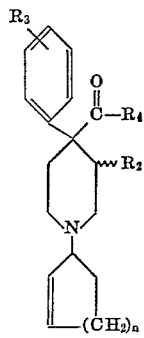

wherein
$R_1$ is hydrogen, chlorine or bromine,
$R_2$ is hydrogen, α-methyl or β-methyl,
$R_3$ is m-hydroxyl, p-hydroxyl, m-methoxy or p-methoxy,
$R_4$ is methyl, ethyl, propyl, methoxy, ethoxy or propoxy, and
$n$ is an integer from 1 to 4, inclusive, and their non-toxic, pharmacologically acceptable acid addition salts.

The compounds according to the present invention may be prepared by reacting a secondary 4-phenylpiperidine of the formula

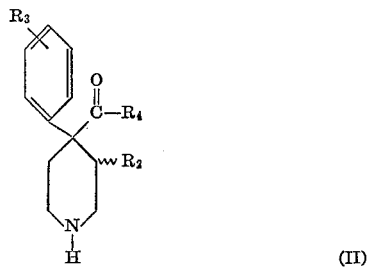

wherein $R_2$, $R_3$ and $R_4$ have the same meanings as in Formula I, or an acid addition salt thereof, with a cycloalkene compound of the formula

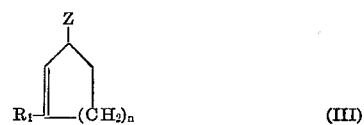

wherein $R_1$ and $n$ have the same meanings as in Formula I and Z is halogen or p-toluenesulfonyloxy.

The reaction between Compounds II and III is preferably carried out in the presence of an inert organic solvent, such as a lower alkanol or a mixture of dimethylformamide and tetrahydrofuran, and in the presence of a weak base at a temperature between 50 and 150° C. The reactants may be employed in a molar ratio of 1:1, but it is preferred if Compound III is provided in excess of 1 mol per mol of Compound II.

In those instances where $R_3$ in the reaction product of the Formula I is hydroxyl, this hydroxyl group may subsequently be methylated, if desired, by conventional methods; and conversely, if $R_3$ in the reaction product is methoxy, this methoxy substituent may be demethylated by conventional methods.

The compounds of the Formula I are bases and will, therefore, form acid addition salts with inorganic and organic acids. Examples of non-toxic, pharmacologically acceptable acid addition salts are those formed with hydrochloric acid, hydrobromic acid, sulfuric acid, phosphoric acid, nitric acid, acetic acid, methanesulfonic acid, tartaric acid, fumaric acid, maleic acid, citric acid, ascorbic acid, caproic acid, propionic acid, 8-chlorotheophylline and the like.

The secondary 4-phenyl-piperidines II required as starting materials for the preparation of the compounds according to the present invention may themselves be prepared by known methods, such as by the processes described in Chemische Berichte 74, 1433 (1941); German Patent 679,281; Swiss Patent 236,312; and U.S. Patent 3,004,977.

Using these processes, the following starting compounds of the Formula II were prepared:

| | M.P., °C. |
|---|---|
| 4-(3-hydroxyphenyl)-4-acetyl-piperidine | 205 |
| 4-(3-hydroxyphenyl)-4-propionyl-piperidine | 223 |
| 4-(3-hydroxyphenyl)-4-butyryl-piperidine·HCl | 216 |
| 4 - (3 - hydroxyphenyl) - 4 - methoxycarbonyl-piperidine·HCl | 244 |
| 4 - (3 - hydroxyphenyl) - 4 - ethoxycarbonyl-piperidine·HCl | 192 |
| 4 - (3 - hydroxyphenyl) - 4 - propoxycarbonyl-piperidine·HCl | 158 |
| 4 - (3 - methoxyphenyl) - 4 - propionyl-piperidine·HCl | 202 |
| 4 - (3 - methoxyphenyl) - 4 - ethoxycarbonyl-piperidine·HCl | 163 |
| 4-(4-hydroxyphenyl)-4-propionyl-piperidine | 166 |
| 4 - (4 - hydroxyphenyl) - 4 - ethoxycarbonyl-piperidine·HCl | 199 |
| α - 3 - methyl - 4 - (3-hydroxyphenyl) - 4 - propionyl-piperidine | 209 |
| α - 3 - methyl - 4 - (3-hydroxyphenyl) - 4 - methoxycarbonyl-piperidine·HCl | 218 |
| β - 3 - methyl - 4 - (3 - hydroxyphenyl)-4-methoxycarbonyl-piperidine·HCl | 212 |
| α - 3 - methyl-4-(3-hydroxyphenyl)-4-ethoxycarbonyl-piperidine | 175–178 |
| β - 3 - methyl - 4-(3-hydroxyphenyl)-4-ethoxycarbonyl-piperidine | 146–149 |

The following examples further illustrate the present invention and will enable others skilled in the art to understand it more completely. It should be understood, however, that the instant invention is not limited to the particular examples given below.

EXAMPLE 1

Preparation of 1-(3-chloro-2-cyclohexenyl)-4-(3-hydroxyphenyl) - 4 - methoxycarbonyl-piperidine and its hydrochloride A mixture of 2.72 gm. (0.01 mol) of 4-(3-hydroxyphenyl)-4-methoxycarbonyl-piperidine hydrochloride, 2.1 gm. (0.025 mol) of sodium bicarbonate, 2.1 gm. (0.011 mol) of 1-chloro-3-bromo-cyclohexene, 10 cc. of dimethylformamide and 25 cc. of tetrahydrofuran was refluxed for six hours. Thereafter, the solvent was removed by vacuum distillation, and the residue was extracted with chloroform and water. The aqueous phase was separated and again extracted with chloroform, and the combined chloroform extract solutions were washed with water and dried with sodium sulfate. The chloroform was evaporated, leaving the raw reaction product as a residue. The raw product was dissolved in 20 cc. of chloroform, the solution was filtered through a chromatographic column with 75 gm. of aluminum oxide (neutral aluminum oxide, activity II), and the column was washed with chloroform. The filtrate was evaporated, leaving pure crystalline 1 - (3 - chloro - 2-cyclohexenyl)-4-(3-hydroxyphenyl)-4-methoxycarbonyl-piperidine as a residue.

The residue was dissolved in 20 cc. of ethanol, the solution was acidified with 4 cc. of 2.5 N ethanolic hydrochloric acid, and then ether was added to the solution until it became cloudy. The solution was cooled, the precipitate formed thereby was separated by vacuum filtration, and the filter cake was washed with ether. 2.1 gm. (54% of theory) of a substance having a melting point of 231° C. were obtained; it was identified to be the hydrochloride of 1 - (3 - chloro - 2-cyclohexenyl)-4-(3-hydroxyphenyl)-4-methoxy-carbonyl-piperidine of the formula

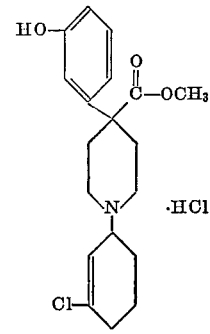

After recrystallization from a mixture of ethanol and ether it had a melting point of 233° C.

EXAMPLE 2

Preparation of 1 - (3 - chloro - 2 - cycloheptenyl)-4-(3-hydroxyphenyl)-4-propionyl-piperidine hydrochloride A mixture of 2.33 gm. (0.01 mol) of 4-(3-hydroxyphenyl)-4-propionyl-piperidine, 1.56 gm. (0.015 mol) of sodium carbonate, 2.3 gm. (0.011 mol) of 1-chloro-3-bromocycloheptene and 35 cc. of ethanol was refluxed for six hours. The reaction mixture was then worked up as described in Example 1, yielding 1-(3-chloro-2-cycloheptenyl) - 4 - (3 - hydroxyphenyl)-4-propionyl-piperidine, which was then converted into its hydrochloride. 2.0 gm. (50% of theory) of the hydrochloride, M.P. 219° C., of the formula

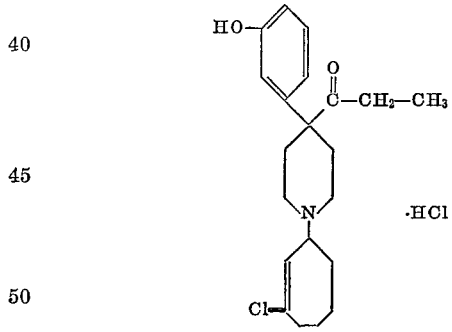

were obtained.

EXAMPLE 3

Using a procedure analogous to that described in Example 2, 1 - (2 - cyclopentenyl) - 4-(3-hydroxyphenyl)-4-propionyl-piperidine and its hydrochloride, M.P. 206° C., of the formula

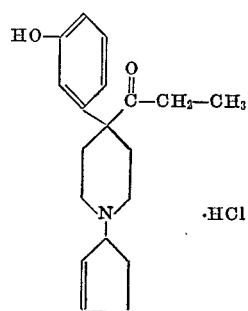

were prepared from 4-(3-hydoxyphenyl)-4-propionyl-piperidine and 1-bromo-cycloheptene-2. The yield of hydrochloride was 45% of theory.

EXAMPLE 4

Using a procedure analogous to that described in Example 1, 1-(2-cyclopentenyl)-4-(3-hydroxyphenyl)-4-methoxycarbonyl-piperidine and its hydrochloride were prepared from 4-(3-hydroxyphenyl)-4-methoxycarbonyl-piperidine hydrochloride and 1-bromo-cyclopentene-2.

EXAMPLE 5

Using a procedure analogous to that described in Example 1, 1-(2-cyclopentenyl)-4-(3-hydroxyphenyl)-4-ethoxycarbonyl-piperidine and its hydrochloride were prepared from 4-(3-hydroxyphenyl)-4-ethoxycarbonyl-piperidine hydrochloride and 1-bromo-cyclopentene-2.

EXAMPLE 6

Using a procedure analogous to that described in Example 2, 1-(2-cyclohexenyl)-4-(3-hydroxyphenyl)-4-acetyl-piperidine and its hydrochloride, M.P. 234° C., of the formula

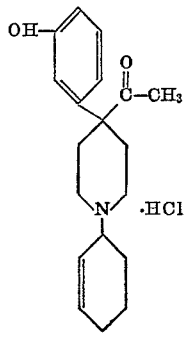

were prepared from 4-(3-hydroxyphenyl)-4-acetyl-piperidine and 1-bromo-cyclohexene-2. The yield of hydrochloride was 68% of theory.

EXAMPLE 7

Using a procedure analogous to that described in Example 2, 1-(2-cyclohexenyl)-4-(3-hydroxyphenyl)-4-propionyl-piperidine and its hydrochloride, M.P. 202° C., were prepared from 4-(3-hydroxyphenyl)-4-propionyl-piperidine and 1-bromo-cyclohexene-2. The yield of hydrochloride was 58% of theory.

EXAMPLE 8

Using a procedure analogous to that described in Example 1, 1-(2-cyclohexenyl)-4-(3-hydroxyphenyl)-4-butyryl-piperidine and its hydrochloride, M.P. 150° C., of the formula

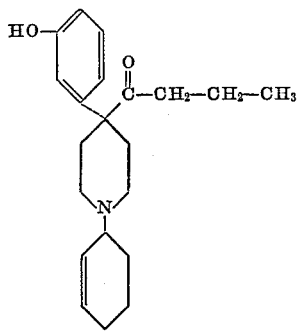

where prepared from 4-(3-hydroxyphenyl)-4-butyryl-piperidine hydrochloride and 1-bromo-cyclohexene-2. The yield of hydrochloride was 70% of theory.

EXAMPLE 9

Using a procedure analogous to that described in Example 1, 1-(2-cyclohexenyl)-4-(3-hydroxyphenyl)-4-methoxycarbonyl-piperidine and its hydrochloride, M.P. 215° C., were prepared from 4-(3-hydroxyphenyl)-4-methoxy-carbonyl-piperidine hydrochloride and 1-bromo-cyclohexene-2. The yield of hydrochloride was 71% of theory.

EXAMPLE 10

Using a procedure analogous to that described in Example 1, 1-(2-cyclohexenyl)-4-(3-hydroxyphenyl)-4-ethoxycarbonyl-piperidine and its hydrochloride, M.P. 209° C., were prepared from 4-(3-hydroxyphenyl)-4-ethoxy-carbonyl-piperidine hydrochloride and 1-bromo-cyclohexene-2. The yield of hydrochloride was 78% of theory.

EXAMPLE 11

Using a procedure analogous to that described in Example 1, 1-(2-cyclohexenyl)-4-(3-hydroxyphenyl)-4-propoxycarbonyl-piperidine and its hydrochloride, M.P. 216° C., were prepared from 4-(3-hydroxyphenyl)-4-propoxycarbonyl-piperidine hydrochloride and 1-bromo-cyclohexene-2. The yield of hydrochloride was 74% of theory.

EXAMPLE 12

Using a procedure analogous to that described in Example 1, 1-(2-cyclohexenyl)-4-(3-methoxyphenyl)-4-propionyl-piperidine and its hydrochloride, M.P. 157° C., were prepared from 4-(3-methoxyphenyl)-4-propionyl-piperidine hydrochloride and 1-bromo-cyclohexene-2. The yield of hydrochloride was 60% of theory.

EXAMPLE 13

Using a procedure analogous to that described in Example 1, 1-(2-cyclohexenyl)-4-(4-hydroxyphenyl)-4-ethoxycarbonyl-piperidine and its hydrochloride, M.P. 187° C., were prepared from 4-(4-hydroxyphenyl)-4-ethoxycarbonyl-piperidine hydrochloride and 1-bromo-cyclohexene-2. The yield of hydrochloride was 41% of theory.

EXAMPLE 14

Using a procedure analogous to that described in Example 1, 1-(2-cyclohexenyl)-3α-methyl-4-(3-hydroxyphenyl)-4-ethoxycarbonyl-piperidine and its hydrochloride, M.P. 187° C., of the formula

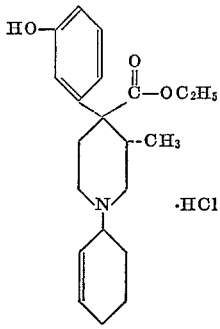

were prepared from 3α-methyl-4-(3-hydroxyphenyl)-4-ethoxycarbonyl-piperidine and 1-bromo-cyclohexene-2. The yield of hydrochloride was 12% of theory.

EXAMPLE 15

Using a procedure analogous to that described in Example 1, 1-(2-cyclohexenyl)-3β-methyl-4-(3-hydroxyphenyl)-4-ethoxycarbonyl-piperidine and its hydrochloride, M.P. 208° C., were prepared from 3β-methyl-4-(3-hydroxyphenyl)-4-ethoxycarbonyl-piperidine and 1-bromocyclohexene-2. The yield of hydrochloride was 71% of theory.

EXAMPLE 16

Using a procedure analogous to that described in Example 2, 1-(2-cyclohexenyl)-3α-methyl-4-(3-hydroxyphenyl)-4-propionyl-piperidine and its hydrochloride, M.P. 206° C., were prepared from 3α-methyl-4-(3-hydroxyphenyl)-4-propionyl-piperidine and 1-bromo-cyclohexene-2. The yield of hydrochloride was 49% of theory.

EXAMPLE 17

Using a procedure analogous to that described in Example 2, 1 - (2 - cyclohexenyl)-4-(4-hydroxyphenyl) - 4-propionyl-piperidine and its hydrochloride, M.P. 232° C., of the formula

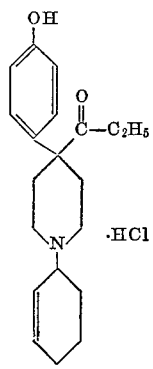

were prepared from 4 - (3-hydroxyphenyl)-4-propionyl-piperidine and 1-bromo-cyclohexene-2. The yield of hydrochloride was 56% of theory.

EXAMPLE 18

Using a procedure analogous to that described in Example 2, 1-(2-cycloheptenyl)-4-(3-hydroxyphenyl)-4-propionyl-piperidine and its hydrochloride, M.P. 204° C., were prepared from 4-(3-hydroxyphenyl) - 4 - propionyl-piperidine and 1-bromo-cycloheptene-2. The yield of hydrochloride was 53% of theory.

EXAMPLE 19

Using a procedure analogous to that described in Example 1, 1-(2-cycloheptenyl) - 4 - (3 - hydroxyphenyl)-4-methoxy-carbonyl-piperidine and its hydrochloride, M.P. 222° C., were prepared from 4 - (3-hydroxyphenyl)-4-methoxy-carbonyl-piperidine hydrochloride and 1-bromo-cycloheptene-2. The yield of hydrochloride was 41% of theory.

EXAMPLE 20

Using a procedure analogous to that described in Example 1, 1 - (2-cycloheptenyl) - 4 - (3-hydroxyphenyl)-4-ethoxycarbonyl-piperidine and its hydrochloride, M.P. 222° C., were prepared from 4-(3-hydroxyphenyl)-4-ethoxycarbonyl-piperidine hydrochloride and 1-bromo-cycloheptene-2. The yield of hydrochloride was 40% of theory.

EXAMPLE 21

Using a procedure analogous to that described in Example 1, 1 - (2-cycloheptenyl)-4-(3-methoxyphenyl)-4-propionyl-piperidine and its hydrochloride, M.P. 178° C., of the formula

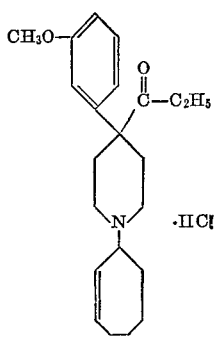

were prepared from 4-(3-methoxyphenyl)-4-propionyl-piperidine hydrochloride and 1-bromo-cycloheptene-2. The yield of hydrochloride was 43% of theory.

EXAMPLE 22

Using a procedure analogous to that described in Example 2, 1-(2-cyclo-octenyl)-4-(3-hydroxyphenyl)-4-propionyl-piperidine and its hydrochloride, M.P. 211° C., of the formula

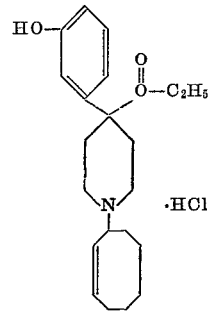

were prepared from 4-(3-hydroxyphenyl)-4-propionyl-piperidine hydrochloride and 1-bromo-cyclo-octane-2. The yield of hydrochloride was 42% of theory.

EXAMPLE 23

Using a procedure analogous to that described in Example 1, 1-(2-cyclo-octenyl)-4-(3-hydroxyphenyl)-4-methoxycarbonyl-piperidine and its hydrochloride, M.P. 237° C., were prepared from 4-(3-hydroxyphenyl)-4-methoxycarbonyl-piperidine hydrochloride and 1-bromo-cyclo-octene-2. The yield of hydrochloride was 48% of theory.

EXAMPLE 24

Using a procedure analogous to that described in Example 1, 1 - (2-cyclo-octenyl) - 4 - (3-hydroxyphenyl)-4-ethoxycarbonyl-piperidine and its hydrochloride, M.P. 170° C., were prepared from 4-(3-hydroxyphenyl)-4-ethoxycarbonyl-piperidine hydrochloride and 1-bromo-cyclo-octene-2. The yield of hydrochloride was 41% of theory.

EXAMPLE 25

Using a procedure analogous to that described in Example 1, 1 - (2-cyclo-octenyl) - 4-(4-hydroxyphenyl)-4-ethoxycarbonyl-piperidine and its hydrochloride, M.P. 229° C., were prepared from 4-(4-hydroxyphenyl)-4-ethoxycarbonyl-piperidine hydrochloride and 1-bromo-cyclo-octene-2. The yield of hydrochloride was 41% of theory.

EXAMPLE 26

Using a procedure analogous to that described in Example 2, 1-(3-chloro-2-cyclopentenyl)-4-(3-hydroxyphenyl)-4-propionyl-piperidine and its hydrochloride, M.P. 219° C., of the formula

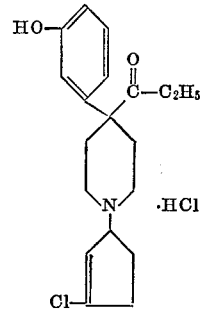

were prepared from 4-(3-hydroxyphenyl)-4-propionyl-piperidine hydrochloride and 1-chloro-3-bromo-cyclopentene. The yield of hydrochloride was 14% of theory.

EXAMPLE 27

Using a procedure analogous to that described in Example 1, 1-(3-chloro-2-cyclopentenyl)-4-(3-hydroxyphenyl)-4-methoxycarbonyl-piperidine and its hydrochloride, M.P. 202° C., were prepared from 4-(3-hydroxyphenyl)-4-methoxycarbonyl-piperidine hydrochloride and 1-chloro-3-bromo-cyclopentene. The yield of hydrochloride was 30% of theory.

EXAMPLE 28

Using a procedure analogous to that described in Example 1, 1-(3-chloro-2-cyclopentenyl)-4-(3-hydroxyphenyl)-4-ethoxycarbonyl-piperidine and its hydrochloride, M.P. 205° C., were prepared from 4-(3-hydroxyphenyl)-4-ethoxycarbonyl-piperidine hydrochloride and 1-chloro-3-bromo-cyclopentene. The yield of hydrochloride was 18% of theory.

EXAMPLE 29

Using a procedure analogous to that described in Example 2, 1-(3-chloro-2-cyclopentenyl)-4-(4-hydroxyphenyl)-4-propionyl-piperidine and its hydrochloride, M.P. 213° C., of the formula

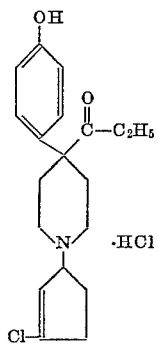

were prepared from 4-(4-hydroxyphenyl)-4-propionyl-piperidine and 1-chloro-3-bromo-cyclopentene. The yield of hydrochloride was 22% of theory.

EXAMPLE 30

Using a procedure analogous to that described in Example 2, 1-(3-chloro-2-cyclohexenyl)-4-(3-hydroxyphenyl)-4-acetyl-piperidine and its hydrochloride, M.P. 225° C., were prepared from 4-(3-hydroxyphenyl)-4-acetyl-piperidine hydrochloride and 1-chloro-3-bromo-cyclohexene. The yield of hydrochloride was 34% of theory.

EXAMPLE 31

Using a procedure analogous to that described in Example 2, 1-(3-chloro-3-cyclohexenyl)-4-(3-hydroxyphenyl)-4-propionyl-piperidine and its hydrochloride, M.P. 175° C., were prepared from 4-(3-hydroxyphenyl)-4-propionyl-piperidine and 1-chloro-3-bromo-cyclohexene. The yield of hydrochloride was 49% of theory.

EXAMPLE 32

Using a procedure analogous to that described in Example 1, 1-(3-chloro-2-cyclohexenyl)-4-(3-hydroxyphenyl)-4-butyryl-piperidine and its hydrochloride, M.P. 182° C., were prepared from 4-(3-hydroxyphenyl)-4-butyryl-piperidine hydrochloride and 1-chloro-3-bromo-cyclohexene. The yield of hydrochloride was 47% of theory.

EXAMPLE 33

Using a procedure analogous to that described in Example 1, 1-(3-chloro-2-cyclohexenyl)-4-(3-hydroxyphenyl)-4-ethoxycarbonyl-piperidine and its hydrochloride, M.P. 195° C., were prepared from 4-(3-hydroxyphenyl)-4-ethoxycarbonyl-piperidine hydrochloride and 1-chloro-3-bromo-cyclohexene. The yield of hydrochloride was 68% of theory.

EXAMPLE 34

Using a procedure analogous to that described in Example 1, 1-(3-chloro-2-cyclohexenyl)-4-(3-hydroxyphenyl)-4-propoxycarbonyl-piperidine and its hydrochloride, M.P. 188° C., were prepared from 4-(3-hydroxyphenyl)-4-propoxycarbonyl-piperidine hydrochloride and 1-chloro-3-bromo-cyclohexene. The yield of hydrochloride was 50% of theory.

EXAMPLE 35

Using a procedure analogous to that described in Example 1, 1-(3-chloro-2-cycloheptenyl)-4-(3-hydroxyphenyl)-4-methoxycarbonyl-piperidine and its hydrochloride, M.P. 202° C., of the formula

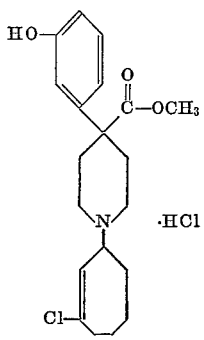

were prepared from 4-(3-hydroxyphenyl)-4-methoxycarbonyl-piperidine hydrochloride and 1-chloro-3-bromo-cycloheptene. The yield of hydrochloride was 50% of theory.

EXAMPLE 36

Using a procedure analogous to that described in Example 1, 1-(3-chloro-2-cycloheptenyl)-4-(3-hydroxyphenyl)-4-ethoxycarbonyl-piperidine and its hydrochloride, M.P. 228° C., were prepared from 4-(3-hydroxyphenyl)-4-ethoxycarbonyl-piperidine hydrochloride and 1-chloro-3-bromo-cycloheptene. The yield of hydrochloride was 41% of theory.

EXAMPLE 37

Using a procedure analogous to that described in Example 1, 1-(3-chloro-2-cycloheptenyl)-4-(3-hydroxyphenyl)-4-propoxycarbonyl-piperidine and its hydrochloride, M.P. 214° C., were prepared from 4-(3-hydroxyphenyl)-4-propoxycarbonyl-piperidine hydrochloride and 1-chloro-3-bromo-cycloheptene. The yield of hydrochloride was 40% of theory.

EXAMPLE 38

Using a procedure analogous to that described in Example 1, 1-(3-chloro-2-cycloheptenyl)-4-(3-methoxyphenyl)-4-propionyl-piperidine and its hydrochloride, M.P. 179° C., of the formula

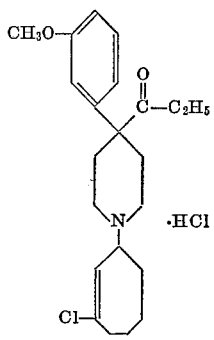

were prepared from 4-(3-hydroxyphenyl)-4-propionyl-piperidine hydrochloride and 1-chloro-3-bromo-cycloheptene. The yield of hydrochloride was 44% of theory.

EXAMPLE 39

Using a procedure analogous to that described in Example 1, 1-(3-chloro-2-cycloheptenyl)-4-(4-hydroxyphenyl)-4-ethoxycarbonyl-piperidine and its hydrochloride, M.P. 199° C., were prepared from 4-(4-hydroxyphenyl)-4-ethoxycarbonyl-piperidine hydrochloride and 1-chloro-3-bromo-cycloheptene. The yield of hydrochloride was 29% of theory.

EXAMPLE 40

Using a procedure analogous to that described in Example 2, 1-(3-chloro-2-cyclo-octenyl)-4-(3-hydroxyphenyl)-4-acetyl-piperidine and its hydrochloride, M.P. 266° C., were prepared from 4-(3-hydroxyphenyl)-4-acetyl-piperidine and 1-chloro-3-bromo-cyclo-octene. The yield of hydrochloride was 43% of theory.

EXAMPLE 41

Using a procedure analogous to that described in Example 2, 1-(3-chloro-2-cyclo-octenyl)-4-(3-hydroxyphenyl)-4-propionyl-piperidine and its hydrochloride, M.P. 207° C., were prepared from 4-(3-hydroxyphenyl)-4-propionyl-piperidine and 1-chloro-3-bromo-cyclo-octene. The yield of hydrochloride was 41% of theory.

EXAMPLE 42

Using a procedure analogous to that described in Example 1, 1-(3-chloro-2-cyclo-octenyl)-4-(3-hydroxyphenyl)-4-methoxycarbonyl-piperidine and its hydrochloride, M.P. 214° C., was prepared from 4-(3-hydroxyphenyl)-4-methoxycarbonyl-piperidine hydrochloride and 1-chloro-3-bromo-cyclo-octene. The yield of hydrochloride was 3% of theory.

EXAMPLE 43

Using a procedure analogous to that described in Example 1, 1-(3-chloro-2-cyclo-octenyl)-4-(3-hydroxyphenyl)-4-ethoxycarbonyl-piperidine and its hydrochloride, M.P. 169° C., were prepared from 4-(3-hydroxyphenyl)-4-ethoxycarbonyl-piperidine hydrochloride and 1-chloro-3-bromo-cyclo-octene. The yield of hydrochloride was 31% of theory.

EXAMPLE 44

Using a procedure analogous to that described in Example 2, 1-(3-chloro-2-cyclo-octenyl)-4-(4-hydroxyphenyl)-4-propionyl-piperidine and its hydrochloride, M.P. 216° C., were prepared from 4-(4-hydroxyphenyl)-4-propionyl-piperidine and 1-chloro-3-bromo-cyclo-octene. The yield of hydrochloride was 32% of theory.

The compounds according to the present invention, that is, those embraced by Formula I and their non-toxic, pharmacologically acceptable acid addition salts, have useful pharmacodynamic properties. More particularly, they exhibit very effective morphine-antagonistic properties and analgesic properties in warm-blooded animals.

For pharmaceutical purposes the compounds of the instant invention are administered to warm-blooded animals perorally, parenterally or by the rectal route as active ingredients in customary dosage unit compositions, that is, compositions in dosage unit form consisting essentially of an inert pharmaceutical carrier and one dosage unit of the active ingredient, such as tablets, coated pills, emulsions, suspensions, solutions, capsules, wafers, suppositories or the like. In addition to the piperidine derivative of this invention, the dosage unit compositions may also comprise as an active ingredient an addiction-producing narcotic analgesic, such as morphine, pethidine, ketohemidone or the like. One dosage unit of the compounds according to the present invention is from 10 to 300 mgm., preferably 50 to 150 mgm.

The following examples illustrate a few dosage unit compositions comprising a compound of the present invention as an active ingredient. The parts are parts by weight unless otherwise specified.

EXAMPLE 45

Hypodermic solution

The solution is compounded from the following ingredients:

| | |
|---|---:|
| 1-(3-chloro-2-cyclohexenyl)-4-(3 - hydroxyphenyl)-4-methoxy-carbonyl - piperidine - methane-sulfonate _____parts__ | 100 |
| Dextrose _____parts__ | 10 |
| Distilled water, q.s. ad, parts by vol. _____ | 2000 |

Compounding procedure.—The piperidine compound and the dextrose are dissolved in the distilled water, the solution is filtered until free from suspended particles, and the filtrate is filled into 2 cc.-ampules, which are thereafter sterilized and sealed. Each ampule contains 100 mgm. of the active ingredient.

EXAMPLE 46

Tablets

The tablet composition is compounded from the following ingredients:

| | Parts |
|---|---:|
| 1-(3-chloro-2-cyclohexenyl)-4-(3 - hydroxyphenyl)-4-methoxy-carbonyl-piperidine hydrochloride ____ | 50 |
| Corn starch _____ | 30 |
| Lactose _____ | 20 |
| Colloidal silicic acid _____ | 2 |
| Gelatin _____ | 3 |
| Magnesium stearate _____ | 2 |
| Talcum _____ | 3 |
| Total _____ | 110 |

Compound procedure.—The piperidine compound, the corn starch, the lactose and the silicic acid are thoroughly admixed with each other, the mixture is moistened with a 10% aqueous solution of the gelatin, the moist mass is forced through a 1.5 mm.-mesh screen, and the resulting granulate is dried. The dry granulate is admixed with the magnesium stearate and the talcum, and the mixture is pressed into 100 mgm.-tablets. Each tablet contains 50 mgm. of the active ingredient.

EXAMPLE 47

Drop solution

The solution is compounded from the following ingredients:

| | |
|---|---:|
| 1-(3 - chloro-2-cyclohexenyl)-4-(3-hydroxyphenyl)-4 - methoxy - carbonyl - piperidine methanesulfonate _____parts__ | 10 |
| p-Hydroxy-benzoic acid methyl ester _____do____ | 0.07 |
| p-Hydroxy-benzoic acid propyl ester _____do____ | 0.03 |
| Ethanol _____do____ | 20 |
| Polyethyleneglycol 400 _____do____ | 20 |
| Distilled water, q.s. ad, parts by vol. _____ | 100 |

Compounding procedure.—The various ingredients are dissolved in the distilled water, and the solution is filtered until clear. 1 cc. of solution contains 100 mgm. of the active ingredient.

EXAMPLE 48

Suppositories

The suppository composition is compounded from the following ingredients:

| | Parts |
|---|---:|
| 1-(3-chloro-2-cyclopentenyl)-4-(3-hydroxyphenyl)-4-methoxy-carbonyl-piperidine hydrochloride ___ | 150 |
| Lactose _____ | 150 |
| Cocoa butter _____ | 1400 |
| Total _____ | 1700 |

Compounding procedure.—The cocoa butter is melted, cooled to about 37° C., the finely pulverized piperidine compound and the lactose are stirred in, and the mixture is homogenized. The homogeneous composition is poured into cooled suppository molds, each holding 1700 mgm. of the composition. Each suppository contains 150 mgm. of the active ingredient.

Although the above dosage unit composition examples illustrate only three compounds according to the invention as active ingredient components, it should be understood that any other compound of the Formula I or a non-toxic, pharmacologically acceptable acid addition salt thereof may be substituted for the particular active ingredient in Examples 45 through 48. Moreover, the amount of active ingredient in each of these examples may be varied within the dosage unit limits set forth above, and the amounts and nature of the inert carrier components may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A member selected from the group consisting of compounds of the formula

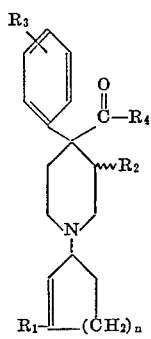

wherein $R_1$ is hydrogen, chlorine or bromine,
$R_2$ is hydrogen, α-methyl or β-methyl,
$R_3$ is m-hydroxy, p-hydroxy, m-methoxy or p-methoxy,
$R_4$ is methyl, ethyl, propyl, methoxy, ethoxy or propoxy, and
$n$ is an integer from 1 to 4, inclusive, and non-toxic, pharmacologically acceptable acid addition salts thereof.

2. A member selected from the group consisting of compounds of the formula

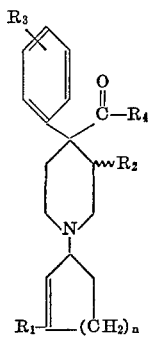

wherein $R_1$ is hydrogen or chlorine,
$R_2$ is hydrogen, α-methyl or β-methyl,
$R_3$ is m-hydroxy, p-hydroxy or m-methoxy,
$R_4$ is methyl, ethyl, propyl, methoxy, ethoxy or propoxy, and
$n$ is an integer from 1 to 4, inclusive, and non-toxic pharmacologically acceptable acid addition salts thereof 3. The hydrochloride of a compound as in claim 2, wherein $R_1$ is chlorine, $R_2$ is hydrogen, $R_3$ is m-hydroxy, $R_4$ is methoxy, and $n$ is 2.

4. The hydrochloride of a compound as in claim 2, wherein $R_1$ is chlorine, $R_2$ is hydrogen, $R_3$ is m-hydroxy, $R_4$ is methoxy, and $n$ is 1.

5. The hydrochloride of a compound as in claim 2, wherein $R_1$ is chlorine, $R_2$ is hydrogen, $R_3$ is m-hydroxy, $R_4$ is methyl, and $n$ is 2.

6. The hydrochloride of a compound as in claim 2, wherein $R_1$ is chlorine, $R_2$ is hydrogen, $R_3$ is m-hydroxy, $R_4$ is ethyl, and $n$ is 2.

7. The hydrochloride of a compound as in claim 2, wherein $R_1$ is chlorine, $R_2$ is hydrogen, $R_3$ is m-hydroxy, $R_4$ is ethoxy, and $n$ is 2.

8. A member selected from the group consisting of compounds of the formula

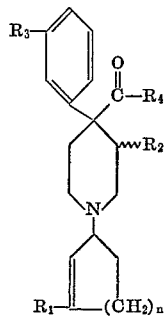

wherein $R_1$ is hydrogen or chlorine,
$R_2$ is hydrogen, α-methyl or β-methyl,
$R_3$ is hydroxy or methoxy,
$R_4$ is methyl, ethyl, propyl, methoxy, ethoxy or propoxy, and
$n$ is an integer from 1 to 4, inclusive, and non-toxic, pharmacologically acceptable acid addition salts thereof.

9. A member selected from the group consisting of compounds of the formula

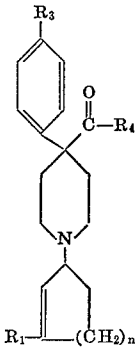

wherein $R_1$ is hydrogen or chlorine,
$R_3$ is hydroxy or methoxy,
$R_4$ is methyl, ethyl, propyl, methoxy, ethoxy or propoxy, and
$n$ is an integer from 1 to 4, inclusive, and non-toxic, pharmacologically acceptable acid addition salts thereof.

10. A member selected from the group consisting of compounds of the formula

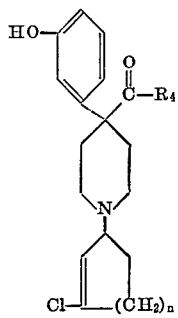

wherein $R_4$ is methyl, ethyl, propyl, methoxy, ethoxy, or propoxy, and $n$ is an integer from 1 to 4, inclusive, and non-toxic, pharmacologically acceptable acid addition salts thereof.

References Cited

UNITED STATES PATENTS 3,217,010  11/1965  Kuhnis et al. _____ 260—294.3

HENRY R. JILES, *Primary Examiner.*

E. D. LEWIS, *Assistant Examiner.*

U.S. Cl. X.R.

260—294.7; 424—267

UNITED STATES PATENT OFFICE
CERTIFICATE OF CORRECTION

Patent No. 3,438,990                          April 15, 1969

Herbert Merz et al.

It is certified that error appears in the above identified patent and that said Letters Patent are hereby corrected as shown below:

Column 1, lines 54 to 67, the formula should appear as show below:

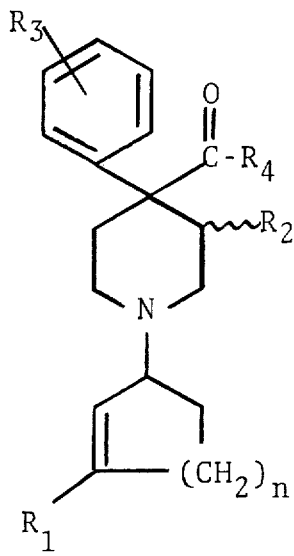

Column 11, line 33, "3%" should read -- 44% --; line 69, "ketohemidone" should read -- ketobemidone --.

Signed and sealed this 14th day of April 1970.

(SEAL)
Attest:

EDWARD M. FLETCHER, JR.                   WILLIAM E. SCHUYLER, JR.
Attesting Officer                             Commissioner of Patents